United States Patent [19]

Gray et al.

[11] 4,016,339
[45] Apr. 5, 1977

[54] SALT WATER BATTERY

[75] Inventors: Thomas J. Gray, Armdale; Jan Wojtowicz, Dartmouth, both of Canada

[73] Assignee: Her Majesty the Queen in right of Canada as represented by the Minister of National Defence, Ottawa, Canada

[22] Filed: Nov. 6, 1975

[21] Appl. No.: 629,569

[30] Foreign Application Priority Data

Nov. 6, 1974 Canada .................... 213150

[52] U.S. Cl. .................... 429/219; 429/220; 429/225; 429/241; 429/119
[51] Int. Cl.² .................... H01M 4/02
[58] Field of Search ......... 136/68, 74, 75, 100 M, 136/120 R, 35, 66, 19, 36, 26, 9; 429/219, 220, 225, 241

[56] References Cited

UNITED STATES PATENTS

| | | | |
|---|---|---|---|
| 309,838 | 12/1884 | Faure | 136/74 |
| 348,482 | 8/1886 | Trippe | 136/68 |
| 397,607 | 2/1889 | Paget | 136/35 |
| 424,809 | 4/1890 | McLaughlin | 136/66 X |
| 850,788 | 4/1907 | Roselle | 136/35 |
| 2,640,090 | 5/1953 | Pucher et al. | 136/100 M |
| 3,023,262 | 2/1962 | Emmerling et al. | 136/100 M |
| 3,468,710 | 9/1969 | Krasnnow et al. | 136/26 |

*Primary Examiner*—Anthony Skapars
*Attorney, Agent, or Firm*—Fleit & Jacobson

[57] ABSTRACT

A battery electrode structure of flat configuration comprises a cast mass of electrochemically active material, said mass having contained therein and exposed opposite surfaces thereof an open-mesh electrically conductive structure adapted for connection to a battery terminal. An open-mesh electrically conductive support member in the mass and in contact with the exposed electrically conductive structure maintains electrical conductivity throughout discharge to ensure maximum use of the active material.

8 Claims, 3 Drawing Figures

SALT WATER BATTERY

BACKGROUND OF THE INVENTION

1. Field of the Invention

This invention relates generally to sea water batteries utilizing electrochemically active material such as lead chloride, cuprous chloride or a lead chloride/cuprous chloride mixture as the cathode electrode material, and more specifically relates to a method of forming cathode electrodes from such materials and the electrode structures so formed.

2. Description of the Prior Art

Sea water batteries utilize sea water as the electrolyte, metals such as aluminum or magnesium as the anode and solid insoluble chlorides as the cathode. A typical combination is silver chloride as the cathode and, for example, magnesium as the anode.

Although silver chloride gives higher voltages than lead chloride the latter is preferred from the viewpoint of cost. However, conventionally formed lead chloride electrodes suffer from the disadvantage of fragility, both initially and during operation. The conventional technique for forming lead chloride electrodes is to mix lead chloride powder with a binder and with carbon or a similar electrically conducting material. The powderous mixture is then compacted under high pressure around both sides of a metallic conductor, which typically comprises copper or nickel gauze, perforated sheet or expanded metal.

The presence of the required conducting material and binding agent in the electrode structure decreases the concentration of active material in the electrode. Since the efficiency of the electrode, and hence the cell wherein it is employed, is largely dependent upon the amount of active material contained in the given volume, the presence of other substances such as conducting materials and binders clearly reduces the electrical efficiency of the structure.

OBJECT OF THE INVENTION

It is therefore an object of the present invention to provide an electrode structure having enhanced electrical characteristics and which does not require the presence of binders and conducting materials dispersed therethrough.

SUMMARY OF THE INVENTION

It is a further object of the present invention to provide an electrode structure which does not suffer from the disadvantages of fragility and weakness attributable to prior art devices and which combines the properties of good mechanical strength and electrical performance.

Thus, according to the present invention, there is provided a battery electrode structure having a substantially flat configuration comprising a cast mass of electrochemically active material, said mass having contained therein and exposed opposed major surfaces thereof an open-mesh or perforated electrically conductive structure adapted for connection to a battery terminal, the cast mass further containing an open-mesh electrically conducting support member in contact with said exposed open-mesh electrically conductive structure.

Preferably, the electrochemically active material is lead chloride, cuprous chloride or a mixture of both.

Since the structure is formed as a cast mass, the structure is of superior mechanical strength to the compressed powder electrodes of the prior art, discussed above.

We have constructed and evaluated a larger number of electrodes in accordance with the present invention. Separate experiments on cathodic reduction of solid chlorides, as well as the development of a simple theoretical model for the system, have helped in a better understanding of the mode of operation and of the characteristic properties of this type of electrode. Two conditions for a reaction such as $PbCl_2 + 2e^- = Pb + 2Cl^-$ to proceed in a continuous manner are unhindered contact between the electrolyte and the active solid phase and a path of low resistance for the electrons arriving from the external branch of the circuit to the solid phase undergoing conversion.

As lead chloride and cuprous chloride are very poor conductors, the charge transfer reaction can occur only in the immediate vicinity of a current collector; in other words, at the ternary interface between electrolyte, solid chloride and the electronic conductor. As stated above, a conventional technique has been to introduce a conductor such as graphite powder into the active mass. The current can then flow from the reaction sites through a chain of the graphite grains to the current collector proper. However, when the current collector is placed at the surface of the cathode, no special means of "increasing the electrode conductivity" are necessary and the conductor material may be dispensed with. Successful operation of the electrode in this configuration depends entirely on the appreciable difference between the molar volumes of the chlorides used as active materials and those of the corresponding metals. Owing to this difference, reduction of lead chloride to the metal results in a residual porosity of about 61.5%. In the case of cuprous chloride, the porosity of the copper matrix formed is even higher (74.6%). The access of the electrolyte to the still unreduced chloride is thus assured, and the process can proceed continuously from the surface of the plate inward. The current collector must be perforated or open-mesh with openings large enough to ensure that the blocking effect does not become significant.

Reduction starts on the surface of the electrode at the line of contact between the chloride, the exposed areas of the current collector structure and the electrolyte. The reaction spreads gradually over the whole surface while simultaneously, owing to the porous structure of the metal formed, the reaction moves into the body of the electrode. The profile of the reaction front gradually approaches a plane parallel to the electrode's surface. Since the reaction occurs at the ternary interface, the length of this boundary determines the charge transfer and lattice transformation overvoltages. Ideally, the overvoltage (except the part connected with concentration changes) becomes practically constant under galvanostatic conditions as soon as the reaction front ceases to differ significantly from the plane.

BRIEF DESCRIPTION OF THE DRAWINGS

The invention will now be described further by way of example only and with reference to the accompanying drawings wherein.

DESCRIPTION OF THE PREFERRED EMBODIMENT

Figures 1, 2:
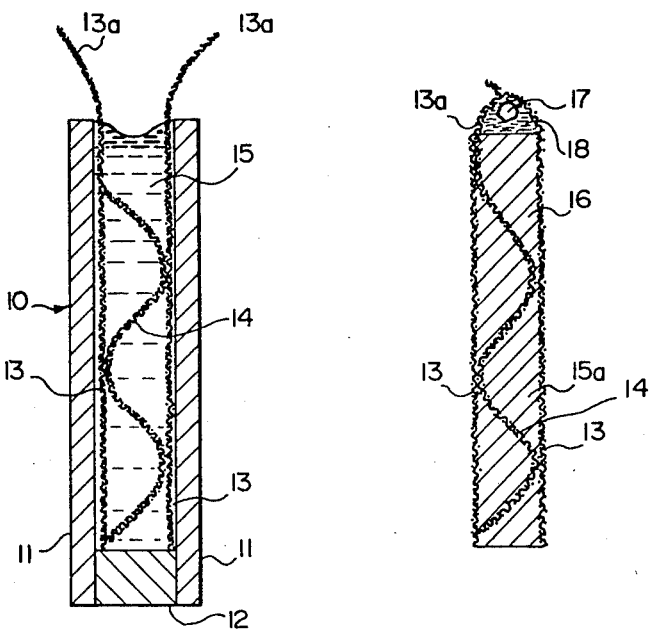
FIG. 1 is a cross-sectional view of a mold construction from which a battery electrode structure may be formed in accordance with one embodiment of the present invention.
FIG. 2 is a cross-sectional view of a battery electrode structure which has been cast from the mold of FIG. 1.

Referring now to the drawings and particularly to FIG. 1 thereof, a demountable steel mold construction 10 comprises side walls 11, a bottom wall 12 and end walls (not shown). Adjacent each wall 11, inside the mold, is placed a copper wire screen 13; the screens 13 are separated and supported by an intermediate copper screen 14, formed into corrugations, as shown in the drawings. Portions 13a of the screens 13 freely extend above the top of the mold 10, and the screens form the current collection elements for the subsequently cast electrode. Typically, the screen size is 14 mesh.

Figure 3:
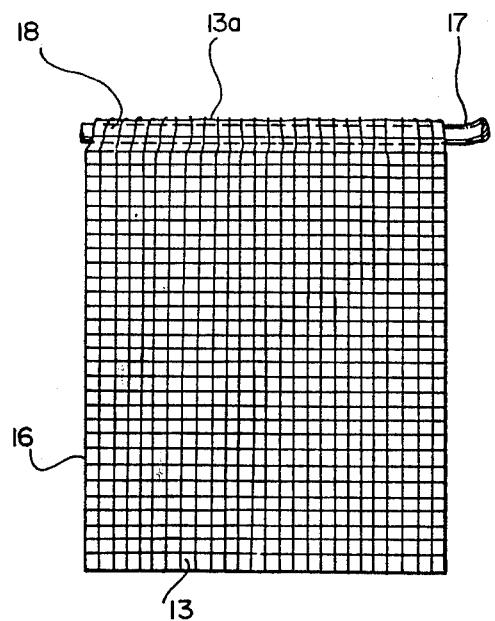
FIG. 3 is a side elevation of the battery electrode structure of FIG. 2.

For casting the electrode, lead chloride 15 is melted in a graphite crucible and brought to a temperature of about 520° C. The melt 15 is then poured into the mold 10 and allowed to cool. After cooling and solidification into the plate-like mass 15a, the mold is dismantled and the cast electrode 16 removed (see FIGS. 2 and 3).

The electrode is trimmed and cleaned, and a copper wire 17 is then placed between the freely extending screen portions 13a which are formed down around the wire 17 and soldered thereto as shown at 18. Finally, the surfaces of the plate are lightly sanded to enlarge the area of the screen wires exposed to the electrolyte.

Thus, the cast electrode comprises a highly conductive perforated support structure (screens 13) to which the connector wire 17 is directly connected, the support structure being surrounded and in intimate contact with the active mass (the lead chloride mass 15a). Since the support structure is exposed at the surfaces of the electrode, there is provided a well-developed three-phase boundary (electrolyte-active mass-conductor) when the electrode is placed in an electrolyte, thus giving a highly efficient, low-loss system.

Utilizing the foregoing method, thick lead chloride plates (⅛ to 1 inch thickness) were made by casting from the melt into molds in which current collectors (copper gauze) were previously inserted. The finished electrodes were smooth and could be produced in various geometrical sizes depending on the proposed utilization. They also exhibited good mechanical strength by virtue of their cast structure. Optimization studies were done so that lead chloride plates of predetermined thickness to meet power requirements and geometric factors of a particular battery application could be fabricated. It has been found that for long life operation (i.e. in excess of several hours duration) Al/PbCl$_2$ batteries should consist of the single cell configuration coupled with an efficient d/c to d/c converter. This arrangement avoids inter-cell shorting problems but provides higher voltages than could be supported by a single one-cell battery.

Cells containing four PbCl$_2$ cathodes of 4 × 8 inches size and five aluminum alloy anodes have been tested in flowing seawater under intermittent load conditions. The battery operated for 50 days with a specific energy yield of about 40.7 Wh/lb. An interesting aspect of these tests is that in the initial stages of battery life fast attainment of high power delivery could be enhanced by shorting the cell through a small resistance load. During later stages the rise to higher power levels took place without shorting; apparently the self-activation process is related to the surface state of the anode. Results of these tests are briefly summarized in the following table.

| Four 4" × 8" Cathodes Cell Performance in Sea Water (8° – 10° C) Flow Rate 7.5 liters/min. | |
| --- | --- |
| Daily Operating Level | Emf (Volts) |
| 22.5 hours at 0.375 watts | 0.66 – 0.8 |
| 1.0 hours at 3.25 watts | 0.47 – 0.64 |
| 0.5 hours at 3.75 watts | 0.42 – 0.63 |

Whilst the invention has been exemplified by reference to a lead chloride structure, it will be appreciated that many alternative arrangements are possible without departing from the spirit of the invention. As hereinbefore stated, a mixture of lead chloride and cuprous chloride may be employed instead of lead chloride alone. Typical improvements achieved using copper chloride in the lead chloride melt are from 15 to 20 percent in output voltage under the same current loading conditions.

It is, of course, essential that the active mass be formed from a material which does not lose its electrochemically active properties in the melting and casting operations, for example, by decomposition. Also, it is highly desirable that the product of discharge during operation of the cell be conductive and have a lower molar volume than the active mass. With these properties, the mass becomes porous as the cell discharges, thus permitting the electrochemical reaction to proceed deep into the electrode body without excessive drop in voltage.

We claim:

1. A battery electrode structure having a substantially flat configuration comprising a cast mass of electrochemically active material, said mass having contained therein and exposed at opposed major surfaces thereof, an open-mesh electrically conductive structure for connection to a battery terminal, said cast mass further containing an open-mesh electrically conductive support member in contact with said exposed open-mesh electrically conductive structure.

2. A battery electrode structure as claimed in claim 1, wherein said open-mesh electrically conductive structure comprises a pair of wire screen members respectively provided at said opposed major surfaces of said electrode structure.

3. A battery electrode structure as claimed in claim 2, wherein said open-mesh electrically conductive support member comprises a wire screen formed in corrugations spacing and contacting said pair of wire screen members.

4. A battery electrode structure as claimed in claim 3 wherein said screen members are formed from copper.

5. A battery electrode structure as claimed in claim 1, wherein said cast mass is lead chloride.

6. A battery electrode structure as claimed in claim 1, wherein said cast mass is a mixture of lead chloride and copper chloride.

7. A battery electrode structure as claimed in claim 1, wherein said cast mass is a mixture of lead chloride and silver chloride.

8. A battery electrode structure as claimed in claim 3 wherein said pair of wire screen members extend beyond one extremity of said cast mass and are attached to a connector member extending across said extremity and adapted for connection to a battery terminal.

* * * * *